Jan. 18, 1944.     W. A. RAY     2,339,352
FLUID CONTROL VALVE
Filed Nov. 18, 1941
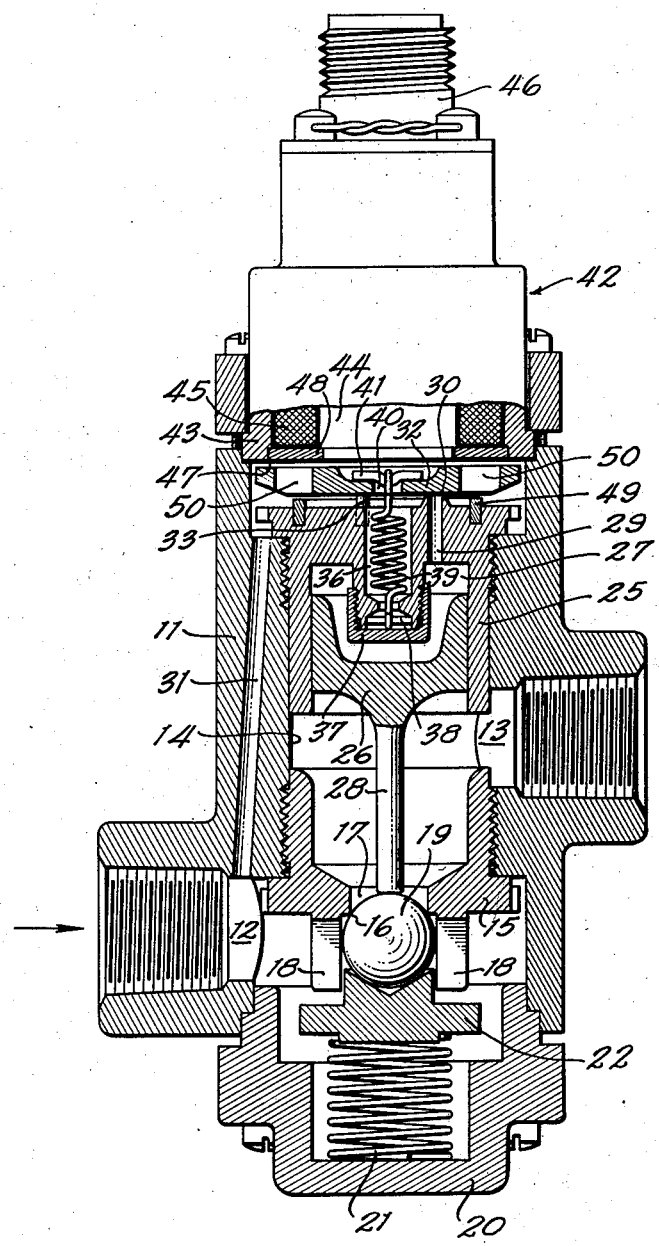
Inventor,
WILLIAM A. RAY
By
John H. Rouse,
Attorney Patented Jan. 18, 1944

2,339,352

UNITED STATES PATENT OFFICE 2,339,352

FLUID CONTROL VALVE

William A. Ray, Los Angeles, Calif.

Application November 18, 1941, Serial No. 419,598

2 Claims. (Cl. 137—139)

My present invention relates to improvements in fluid-pressure-operated pilot-valve-controlled valves, and particularly to those of the "portable" type used in airplanes and other machines in which the parts are subject to relatively rapid wear due to vibration and the high pressure of the fluids ordinarily controlled by the valve.

In valves intended for this purpose it is desirable to incorporate low weight and compactness with a high degree of dependability. It is therefore an object of this invention to provide a valve of the type indicated that is compact and of light weight, and in which all of the parts that are subject to wear are readily accessible for inspection, maintenance, and replacement.

Another object of this invention is to provide a valve of the type indicated that is readily machined and assembled.

Other objects and advantages of this invention will be found in the description, the drawing and the appended claims; and for complete understanding of the invention, reference may be had to the following detailed description and accompanying drawing, wherein the single figure is a view, mainly in vertical section, of a valve embodying my invention.

In the drawing, the numeral 11 indicates a valve casing having an inlet 12 and an outlet 13 fluidly interconnected by a vertical main bore 14. Threaded into the lower end portion of the bore 14, and forming a partition between the inlet and the outlet, is a valve port member 15 providing a main valve seat 16 at the lower end of an opening 17 bored centrally through the port member. Cooperable with the seat 16 is a ball closure member 19, reciprocable on the axis of the main bore 14 and guided in its movements by a plurality of spaced vanes 18 which project downwardly from the underside of the port member 15. A cap 20 is secured to the bottom wall of the casing 11 to close an opening therein. An abutment member 22, having a conical recess in its upper end to receive the lower portion of the ball 19, is held in constant engagement therewith by a spring 21 compressed between the shouldered lower end of the abutment member and the inner bottom wall of the cap 20, the ball thus serving to maintain the spring in position. The main closure member 19 is normally held in its closed position by the inlet pressure of the fluid thereon and by the spring 21.

Threaded in the upper end portion of the main bore 14 is a cylinder 25, which opens at its lower end into the outlet 13. Within this cylinder is a piston 26 having a dependent reduced portion 28, the extremity of which is in constant engagement with the surface of the main closure ball 19 for controlling the movement of the same. A passage 29, eccentrically located in the top wall of the cylinder 25, and extending therethrough, provides means for admitting fluid from the space above the cylinder to the pressure chamber 27 formed by the cylinder walls and the piston. The top surface of the cylinder 25 is relieved to form a conical raised portion surrounding the upper end of the passage 29 to provide a horizontal substantially knife-edged pilot-valve seat 30. The underside of a disk-like metallic pilot closure member 32, of approximately the same diameter as the top surface of the cylinder 25 and positioned coaxially above the same, forms a plane surface cooperable with the seat 30, a pair of spaced stop pins 33 serving normally to support the closure member evenly on its seat.

A passageway 31, located in the side wall of the casing 11, fluidly interconnects the valve inlet 12 with the space above the cylinder 25 whereby, when the pilot closure member 32 is raised from its seat, fluid from the inlet can flow into the pressure chamber 27. When this occurs, the fluid force on the piston 26, due to the large area of the same, is greater than the opposing spring and fluid forces on the main closure member, so that the same is forced away from its seat. Fluid can now flow from inlet 12, through opening 17 to the outlet 13. There is sufficient clearance between the adjacent piston and cylinder walls to allow a slight leakage of fluid from the pressure chamber 27 to the outlet 13, so that upon subsequent movement of the pilot closure member 32 to its closed position, the pressure in chamber 27 drops and the main closure member 19 is again forced into engagement with its seat by the combined forces of spring 21 and of the inlet fluid.

Centrally located in the upper end of the cylinder 25, and extending therethrough, is an opening 36 which is closed at its lower end by a threaded cap 37. The side wall of a restricted portion of the opening 36 forms an abutment for a pin 38 to secure one end of a tension spring 39 with respect to the cylinder. The other end of this spring extends upwardly through the opening 36 and through an opening 40 centrally located in the closure member 32, and is connected to the same by a pin 41 abutting a shouldered portion of the opening 40.

Mounted on, and closing an opening in, the upper wall of the casing 11 is an electromagnet 42 having a cup-shaped outer core 43 and a solid cylindrical inner core 44, between the adjacent walls of which cores is an energizing coil 45. Mounted on the top of the outer core 43 is a socket 46 for connecting the electromagnet to a source of energy. The closure member 32 is of magnetic material and is adapted to be attracted to its open position by the electromagnet. A thin non-magnetic metallic diaphragm 47 is clamped at its margin between the lower end of the outer core 43 and the casing 11 to seal the electromagnet members from the fluid controlled by the valve, and to provide an air gap between the closure member and the electromagnet which prevents magnetic sticking of these parts when the magnet is deenergized. A ring 48, made of non-magnetic material, is set in shouldered lower ends of both the inner and outer cores to provide an unbroken plane surface engaging the top surface of the diaphragm to prevent flexure and consequent rupture thereof.

By the eccentric arrangement of the pilot valve port 29 with respect to the closure member 32, in the opening movement of the member under the attraction of the electromagnet it is first tilted on the seat 30 so that the pressure of the fluid above it is partially relieved, the closure member then being readily moved by the electromagnet to its fully raised position. Encompassing the valve seat 30 and stop pins 33, and symmetrically positioned with respect to the cylinder 25, is a metallic guard ring 49, pressed into an annular recess in the top wall of the cylinder. The top surface of the ring 49 is positioned slightly below, but closely adjacent, the plane of the seat 30 to minimize uneven wear of the seat by limiting the degree of tilt of the pilot closure member thereon. This feature is fully described and claimed in my copending application, Serial No. 418,707, filed November 12, 1941.

Bored through the closure member 32, directly above the guard ring 49, is a plurality of openings 50 which facilitate the flow of fluid across the guard ring in the opening movement of the pilot valve. The openings 50 also serve to remove any "dash-pot" effect which might otherwise occur in the opening movement of the closure member.

By the present construction, in which all of the moving parts are axially arranged in one main bore, a very compact valve structure is attained that lends itself readily to machining and assembly. It will be seen that all of the parts subject to wear are readily accessible for inspection and maintenance, and the capacity of the valve may readily be changed by the substitution of port members having different size openings.

While I have herein shown and described a specific embodiment of my invention, I wish it to be understood that modifications may be made without departing from the spirit of the invention, and that I intend, therefore, to be limited only by the scope of the appended claims.

I claim as my invention:

1. In a fluid pressure operated valve: a vertically elongated casing having a central bore extending longitudinally from its top surface, a partition in said bore adjacent its bottom end and having a port opening therethrough, said casing having an inlet and an outlet communicating with said bore at opposite sides of said partition, a closure cooperable with said port opening to control fluid flow between said inlet and said outlet, a cylinder member removably secured in an upper end portion of said bore and having a wall at its top end, the portion of said bore above said cylinder member being enlarged to permit insertion of the same, a piston for operating said closure and reciprocable in said cylinder, said cylinder end wall having a pilot opening therethrough for supplying pressure fluid to said piston, a disk-like pilot closure of magnetizable material reciprocable in said enlarged upper end portion of the bore for controlling said pilot opening, an electromagnet for operating said pilot closure and closing the top end of said bore to form a chamber above said cylinder end wall, and means providing fluid communication between said inlet and said chamber.

2. A fluid pressure operated valve, as defined in claim 1, wherein means, received in a recess in the top surface of the cylinder member, is provided for biasing the pilot closure to closed position.

WILLIAM A. RAY.